United States Patent
Thottethodi et al.

(10) Patent No.: US 12,008,370 B2
(45) Date of Patent: Jun. 11, 2024

(54) METHOD FOR PREVENTING SECURITY ATTACKS DURING SPECULATIVE EXECUTION

(71) Applicant: Purdue Research Foundation, West Lafayette, IN (US)

(72) Inventors: Mithuna Shamabhat Thottethodi, West Lafayette, IN (US); Terani N Vijaykumar, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/737,794

(22) Filed: May 5, 2022

(65) Prior Publication Data
US 2022/0374235 A1 Nov. 24, 2022

Related U.S. Application Data

(60) Provisional application No. 63/247,789, filed on Sep. 23, 2021, provisional application No. 63/232,777, (Continued)

(51) Int. Cl.
*G06F 9/30* (2018.01)
*G06F 9/38* (2018.01)
*G06F 12/0875* (2016.01)

(52) U.S. Cl.
CPC ........ *G06F 9/30043* (2013.01); *G06F 9/3842* (2013.01); *G06F 12/0875* (2013.01); *G06F 2212/452* (2013.01)

(58) Field of Classification Search
CPC .. G06F 9/30043; G06F 9/3832; G06F 9/3842; G06F 2212/452; G06F 21/55;
(Continued)

(56) References Cited

U.S. PATENT DOCUMENTS 5,377,336 A * 12/1994 Eickemeyer .......... G06F 9/3832
711/213
2008/0263315 A1* 10/2008 Zhang ................. G06F 9/30105
711/208
(Continued)

OTHER PUBLICATIONS

M. K. Qureshi, Ceaser: Mitigating conflict-based cache attacks via encrypted-address and remapping. In 2018 51st Annual IEEE/ACM International Symposium on Microarchitecture (MICRO), pp. 775-787, Oct. 2018.
(Continued)

*Primary Examiner* — Andrew Caldwell
*Assistant Examiner* — Kasim Alli
(74) *Attorney, Agent, or Firm* — Piroozi-IP, LLC

(57) ABSTRACT

A method of verifying authenticity of a speculative load instruction is disclosed which includes receiving a new speculative source-destination pair (PAIR), wherein the source represents a speculative load instruction and the destination represents an associated destination virtual memory location holding data to be loaded onto a register with execution of the source, checking the PAIR against one or more memory tables associated with non-speculative source-destination pairs, if the PAIR exists in the one or more memory tables, then executing the instruction associated with the source of the PAIR, if the PAIR does not exist, then i) waiting until the speculation of the source instruction has cleared as being non-speculative, ii) updating the one or more memory tables, and iii) executing the instruction associated with the source, and if the speculation of the source instruction of the PAIR does not clear as non-speculative, then the source is nullified.

19 Claims, 4 Drawing Sheets

Related U.S. Application Data filed on Aug. 13, 2021, provisional application No. 63/185,122, filed on May 6, 2021.

(58) Field of Classification Search
CPC .......... G06F 21/556; G06F 2212/1052; G06F 21/50; G06F 21/51; G06F 21/52
See application file for complete search history.

(56) References Cited

U.S. PATENT DOCUMENTS

| | | | | |
|---|---|---|---|---|
| 2020/0301712 | A1* | 9/2020 | Sakalis | G06F 9/30054 |
| 2020/0410088 | A1* | 12/2020 | Greenhalgh | G06F 12/1441 |
| 2021/0081530 | A1* | 3/2021 | O'Farrell | G06F 9/30043 |
| 2022/0107784 | A1* | 4/2022 | Favor | G06F 9/30181 |

OTHER PUBLICATIONS

Saileshwar et al., Cleanupspec: An "undo" approach to safe speculation. In Proceedings of the 52nd Annual IEEE/ACM International Symposium on Microarchitecture, Micro '52, p. 73-86, New York, NY, USA, 2019. Association for Computing Machinery.

P. Li et al., Conditional speculation: An effective approach to safeguard out-of-order execution against spectre attacks. In 2019 IEEE International Symposium on High Performance Computer Architecture (HPCA), pp. 264-276, Feb. 2019.

Taram et al., Context-sensitive fencing: Securing speculative execution via microcode customization. 2019.

Kiriansky et al., Dawg: A defense against cache timing attacks in speculative execution processors. Cryptology ePrint Archive, Report 2018/418, 2018.

Loughlin, et al. DOLMA: Securing Speculation with the Principle of Transient Non-Observability, USENIX Association, 30th USENIX Security Symposium, pp. 1397-1414, Aug. 11-13, 2021.

M. Yan et al., Invisispec: Making speculative execution invisible in the cache hierarchy. In 2018 51st Annual IEEE/ACM International Symposium on Microarchitecture (MICRO), pp. 428-441, Oct. 2018.

Weisse et al., Nda: Preventing speculative execution attacks at their source. In Proceedings of the 52nd Annual IEEE/ACM International Symposium on Microarchitecture, Micro '52, p. 572-586, New York, NY, USA, 2019. Association for Computing Machinery.

Ojogbo, et al., Secure automatic bounds checking: prevention is simpler than cure. In Proceedings of the 18th International Symposium on Code Generation and Optimization, pp. 43-55. ACM, 2020.

Canella et al., A systematic evaluation of transient execution attacks and defenses. In Proceedings of the 28th USENIX Conference on Security Symposium, SEC'19, p. 249-266, USA, 2019. USENIX Association.

K. Barber et al., Specshield: Shielding speculative data from microarchitectural covert channels. In 2019 28th International Conference on Parallel Architectures and Compilation Techniques (PACT), pp. 151-164, Los Alamitos, CA, USA, Sep. 2019. IEEE Computer Society.

Carruth, Speculative load hardening. https: //docs.google.com/document/d/1wwcfv3UV9ZnZVcGiGuoITT_61e_Ko3TmoCS3uXLcJR0/edit#heading=h.phdehs44eom6, 2018.

Yu et al., Speculative Data-Oblivious Execution: Mobilizing Safe Prediction for Safe and Efficient Speculative Execution, p. 707-720. IEEE Press, 2020.

Choudhary et al., Speculative Privacy Tracking (SPT): Leaking Information From Speculative Execution Without Compromising Privacy, Micro '21, Oct. 18-22, 2021, Virtual Event, Greece.

Yu et al., Speculative taint tracking (stt): A comprehensive protection for speculatively accessed data. In Proceedings of the 52nd Annual IEEE/ACM International Symposium on Microarchitecture, Micro '52, p. 954-968, 2019. Association for Computing Machinery.

Sakalis et al., Efficient invisible speculative execution through selective delay and value prediction. In Proceedings of the 46th International Symposium on Computer Architecture, ISCA '19, p. 723-735, New York, NY, USA, 2019. Association for Computing Machinery.

* cited by examiner

METHOD FOR PREVENTING SECURITY ATTACKS DURING SPECULATIVE EXECUTION

CROSS-REFERENCE TO RELATED APPLICATIONS

The present non-provisional patent application is related to and claims the priority benefit of U.S. Provisional Patent Application Ser. No. 63/185,122, entitled SECURE SPECULATIVE EXECUTION SYSTEM which was filed May 6, 2021; U.S. Provisional Patent Application Ser. No. 63/232,777, entitled SAFEBET: SECURE, SIMPLE, AND FAST SPECULATIVE EXECUTION which was filed Aug. 13, 2021; and U.S. Provisional Patent Application Ser. No. 63/247,789, entitled A METHOD FOR SECURE, SIMPLE, AND FAST SPECULATIVE EXECUTION which was filed Sep. 23, 2021, the contents of each of which are hereby incorporated by reference in its entirety into the present disclosure.

STATEMENT REGARDING GOVERNMENT FUNDING

None.

TECHNICAL FIELD

The present disclosure generally relates to speculative execution of modern processors, and in particular, to a method of securely carrying out speculative execution.

BACKGROUND

This section introduces aspects that may help facilitate a better understanding of the disclosure. Accordingly, these statements are to be read in this light and are not to be understood as admissions about what is or is not prior art.

For some time now, microprocessor speeds have grown faster than memory speed. Despite many optimizations to reduce the impact of the speed gap, it remains true that the time spent by microprocessors waiting for memory accounts for a significant fraction of execution time.

In order to remedy the aforementioned challenge, for several years now, microprocessor designers have used speculative execution. In a typical speculative execution, a processor may be waiting for memory to supply the data for one instruction which may feed data to the next instruction which uses the data to conditionally branch to one of multiple possible execution paths. In doing so, the processor predicts the branching outcome of the second instruction prior to the completion of the first instruction and proceeds to speculatively execute instructions in the predicted path. In this manner, the processor does not have to remain idle until the execution of the first instruction is complete prior to starting execution of the conditional branch, thereby improving the performance of the processor. Once the execution of the first instruction is complete, one of two outcomes are possible. If the result of the execution reveals that the prediction was correct, all the work done speculatively is now considered non-speculative and the resulting execution is accepted. If however, the execution reveals that the prediction was incorrect, the processor returns to the point where the conditional branch execution began and thus discards all data associated with that mispredicted execution by cleaning up registers.

Speculative execution based processers are nowadays commonplace. As a result, security attacks have also become commonplace. Speculative execution-based security attacks, also referred to as Meltdown and Spectre attacks, affect most modern computer systems which include high-performance microprocessors that utilize speculative execution. These attacks includes hardware-based attacks which can read the entire kernel or browser memory at viable transmission rates (e.g., hundreds of KB/s). While many software-based attacks exist (e.g., buffer overflow), these hardware-based attacks have become significantly more. Since the attacks were revealed, several variants have appeared and more are likely to come on to the scene.

Generally, these hardware-based attacks exploit speculative execution based on the facts that (1) incorrect execution before mis-speculation detection can be leveraged to access transient secrets that are otherwise inaccessible even within the same process, and (2) upon detecting mis-speculation, modern architectures clean up the architectural state, as discussed above (e.g., by rewriting register and memory) but not the micro-architectural state (e.g., branch predictors and caches). The surviving micro-architectural state can act as a side channel that can transmit information with deleterious effect.

To date, the Spectre attacks have three variants. The first variant (CVE-2017-5753) circumvents software bounds-checking by exploiting branch prediction to transiently load forbidden data (e.g., JavaScript transiently loading the Web browser's data). The second variant (CVE-2017-5715) injects indirect branch target (or return address) from the attack process to exploit a gadget (i.e., an attacker-selected code snippet) in a victim process to transiently load forbidden data (e.g., a user process fooling the kernel). The final variant (CVE-2018-3639), known as Spectre-v4, exploits speculative store bypass. Unlike the first two variants, the third has not been shown to be practical.

Several approaches have been implemented to address hardware-based speculative execution-style attacks. Approaches to plug the transmissions must cover all channels which is more difficult than preventing the forbidden access. In fact, rolling-back micro-architectural state to plug the transmission may be susceptible to timing channels. Various other proposals plug specific side channels but make invasive hardware changes (e.g., changes to cache coherence), incur performance loss, may transmit value-predicted secrets, or remain susceptible to other side channels be discovered later. Still other proposals allow the unsafe access but block all side channels by preventing the transmission of the secrets via delaying the secret-dependent instructions until they are no longer speculative. However, these schemes require complex hardware or incur high performance loss.

Therefore, there is an unmet need for a novel approach to address hardware-based attacks on architectures that operate using speculative execution.

SUMMARY

A method of verifying authenticity of a speculative load instruction is disclosed. The method includes receiving a new speculative source-destination pair (PAIR), wherein the source represents a speculative load instruction identified by an associated source virtual memory location where the load instruction is located and the destination represents an associated destination virtual memory location holding data to be loaded onto a register with execution of the source. The method also includes checking the PAIR against one or more memory tables associated with previous combinations of source-destination pairs that have successfully cleared as non-speculative source-destination pairs, wherein each of the source and the destination in the one or more memory tables represent one or more virtual memory locations. If the PAIR exists in the one or more memory tables, then the method includes executing the instruction associated with the source of the PAIR. If the PAIR does not exist in the one or more memory tables, then the method includes i) waiting until the speculation of the source instruction of the PAIR has cleared as being non-speculative or one or more clock cycles later, ii) updating the one or more memory tables, wherein the updating is associated with inclusion of the PAIR as a new authentic pair, and iii) executing the instruction associated with the source of the PAIR. If the speculation of the source instruction of the PAIR does not clear as non-speculative, then the source of the PAIR is nullified.

Another method of verifying authenticity of a speculative control-flow instruction is also disclosed. The method includes receiving a new speculative source-destination pair (PAIR), wherein the source represents a speculative control-flow instruction identified by an associated source virtual memory location where the control-flow instruction is located and the destination represents associated destination virtual memory location where a next instruction to be executed is located. The method also includes checking the PAIR against one or more memory tables associated with previous combinations of source-destination pairs that have successfully cleared as non-speculative source-destination pairs, wherein each of the source and the destination in the one or more memory tables represent one or more virtual memory locations. If the PAIR exists in the one or more memory tables, the method includes fetching the instruction associated with the destination of the PAIR. If the PAIR does not exist in the one or more memory tables, the method includes i) waiting until the speculation of the source instruction of the PAIR has cleared as being non-speculative or one or more program counter clock cycles later, ii) updating the one or more memory tables, wherein the updating is associated with inclusion of the PAIR as a new authentic pair, and iii) fetching the instruction associated with the non-speculative destination of the source. If the speculation of the source instruction of the PAIR does not clear as non-speculative, then the source of the PAIR is nullified.

Yet another method of verifying authenticity of a speculative load instruction is also disclosed. The method includes receiving a new speculative source-destination pair (PAIR), wherein the source represents a speculative load instruction identified by an associated source physical memory location where the load instruction is located and the destination represents an associated destination physical memory location holding data to be loaded onto a register with execution of the source. The method also includes checking the PAIR against one or more memory tables associated with previous combinations of source-destination pairs that have successfully cleared as non-speculative source-destination pairs, wherein each of the source and the destination in the one or more memory tables represent one or more physical memory locations. If the PAIR exists in the one or more memory tables, then the method includes executing the instruction associated with the source of the PAIR. If the PAIR does not exist in the one or more memory tables, then the method includes i) waiting until the speculation of the source instruction of the PAIR has cleared as being non-speculative or one or more program counter clock cycles later, ii) updating the one or more memory tables, wherein the updating is associated with inclusion of the PAIR as a new authentic pair, and iii) executing the instruction associated with the source of the PAIR. If the speculation of the source instruction of the PAIR does not clear as non-speculative, then the source of the PAIR is nullified.

Still yet another method of verifying authenticity of a speculative control-flow instruction is also disclosed. The method includes receiving a new speculative source-destination pair (PAIR), wherein the source represents a speculative control-flow instruction identified by an associated source physical memory location where the control-flow instruction is located and the destination represents associated destination physical memory location where a next instruction to be executed is located. The method further includes checking the PAIR against one or more memory tables associated with previous combinations of source-destination pairs that have successfully cleared as non-speculative source-destination pairs, wherein each of the source and the destination in the one or more memory tables represent one or more physical memory locations. If the PAIR exists in the one or more memory tables, then the method includes fetching the instruction associated with the destination of the PAIR. If the PAIR does not exist in the one or more memory tables, then the method includes i) waiting until the speculation of the source instruction of the PAIR has cleared as being non-speculative or one or more program counter clock cycles later, ii) updating the one or more memory tables, wherein the updating is associated with inclusion of the PAIR as a new authentic pair, and iii) fetching the instruction associated with the non-speculative destination of the source. If the speculation of the source instruction of the PAIR does not clear as non-speculative, then the source of the PAIR is nullified.

DETAILED DESCRIPTION

Figure 1:
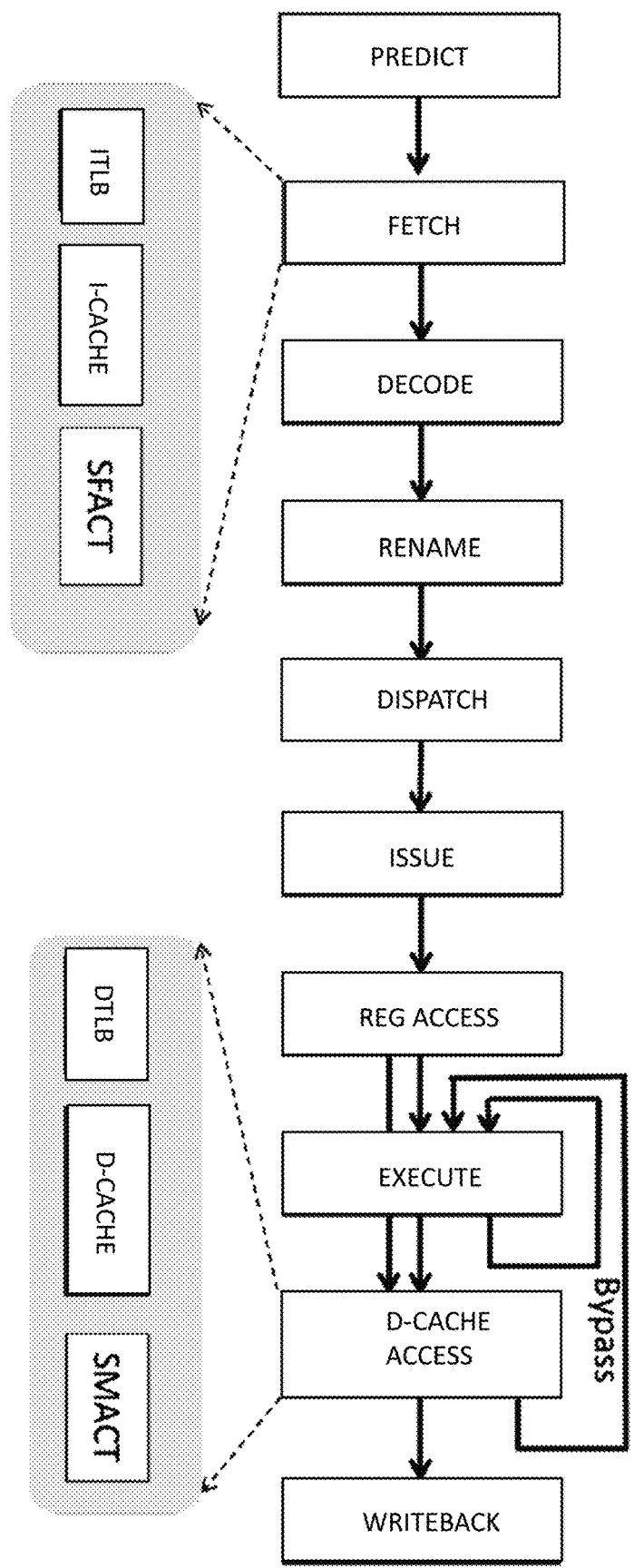
FIG. 1 is a schematic of an out-of-order issue pipeline with SafeBet tables (SMACT and SFACT), where SafeBet represent the method of the present disclosure and Speculative Memory Access Control Table (SMACT) and Speculative instruction Fetch Access Control Table (SFACT) represents tables which track non-speculative source instruction-destination location pairs that can be used to check every speculative access for safety.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach referred to herein as SafeBet is provided to address hardware-based attacks on architectures that operate using speculative execution. Towards this end, a methodology is described herein which allows only safe accesses based on the key observation that speculatively accessing a location for data access or instruction fetch is safe if the location has been accessed previously non-speculatively by the same instruction (i.e., the instruction is permitted to access the location). A source instruction is also referred to herein as a source micro-op, as known to a person having ordinary skill in the art. Otherwise, the speculative access is deemed as potentially unsafe. The present disclosure describes a methodology which employs a Speculative Memory Access Control Table (SMACT) and a Speculative instruction Fetch Access Control Table (SFACT) which tracks non-speculative source instruction-destination location pairs to check every speculative access for safety. While the permitted accesses proceed as usual, disallowed accesses wait until reaching commit to trigger replay without any intrusive hardware changes. SafeBet exploits redundancy in the upper-order bits of source and destination addresses to reduce the table sizes via a bit mask representation. To achieve larger effective table capacity, SafeBet safely coarsens the source and destination granularity. Finally, the permissions are revoked when the source or destination memory is freed to prevent unsafe use of stale permissions. To avoid cache coherence-like complexity, SafeBet performs the revocations in software whose overhead is amortized by lazily batching several frees. SafeBet achieves this security using only simple table-based access control and replay with virtually no change to the pipeline. Software simulations show that SafeBet uses 18 KB per core for the tables to perform within 6% on average (62% at worst) of the unsafe baseline behind which NDA-restrictive, a previous scheme of comparable (a) security and (b) hardware complexity, lags by 83% on average.

SafeBet (the method of the present disclosure) allows only safe accesses, thereby preventing transmission of secrets. As mentioned above, SafeBet is based on a key observation that speculatively accessing a location is safe if the location has been accessed previously non-speculatively by the same instruction (i.e., the instruction is permitted to access the location). The instruction is referred to as source and the location is referred to as the destination. However, gadgets can exploit control-flow speculation to fool victim code into transiently accessing forbidden data that the code accessed non-speculatively in the past. To prevent this loophole, a speculative instruction fetch is permitted similarly only if in the past the source instruction (e.g., a branch or return) has non-speculatively fetched the destination. The permission is per source instruction because some destinations are forbidden for some sources within the same process in some attack scenarios (e.g., the browser data is forbidden for the tabs within the browser process). A data access or an instruction fetch that is deemed potentially unsafe can proceed only upon reaching commit. Thus, while no unsafe access or fetch (false positive) is allowed, some safe accesses or fetches may be delayed (false negative), thereby resulting in some performance loss.

SafeBet employs the following schemes: First to track non-speculative data access and instruction fetch source-destination pairs, respectively, Speculative Memory Access Control Table (SMACT), and Speculative instruction Fetch Access Control Table (SFACT) are added to the existing microprocessor architectures. While the permissions are created in the tables upon the source reaching commit, speculative sources look up the SMACT and the SFACT, respectively, in parallel with the Data Translation Lookaside buffer (DTLB) and the data cache, and the Instruction TLB (ITLB) and the instruction cache. Disallowed accesses and fetches wait until the source instruction reaches commit. Instead, waiting only until the access or fetch becomes non-speculative achieves a shorter delay which is important when all accesses are delayed, however, this approach requires complex hardware changes. Because SafeBet's false negative rates, mainly due to misses in the tables, are low, SafeBet employs the simpler choice by leveraging the well-known replay scheme for cache misses. Second, to shrink the size, Branch Target Buffer (BTB) of a microprocessor architecture often uses fewer bits than needed for the source and destination addresses. However, such compression in the SMACT or SFACT would induce potentially unsafe aliases where the permissions of a source-destination pair would be inherited by other aliases. As such, using all the source and destination address bits avoids any aliasing, but does incur overhead. According to one embodiment of the present disclosure, these overheads are reduced by exploiting the redundancy in the upper-order address bits of the sources and destinations via a two-level organization for the tables, so that many first-level entries (lower-order bits) share a second-level entry (upper-order bits), implemented via bit masks. Third, to increase the effective capacity and decrease the false-negative rates of SafeBet's tables, the method of the present disclosure according to one embodiment, coarsen the granularity of the source and destination. Coarsening the source to a granularity (e.g., GB) is safe if the code and static data from various trust domains (e.g., user code, libraries either together or in subsets, browser, and kernel) are placed at boundaries aligned to the granularity. However, coarsening the destination to a granularity while avoiding aliases requires that the minimum size for dynamic memory allocation be the granularity (e.g., no larger than 32-64 B to avoid internal fragmentation). Fourth, a source-destination pair's permission must be revoked when the source or destination memory is freed; otherwise, a stale permission could be used to access illegally a freed destination that is later reallocated. Hardware invalidations for such revocations in a multicore processor system may incur cache coherence-like complexity. Instead, the method of the present disclosure employs software revocations, similar to TLB shootdowns. To amortize the software overhead imposed by frequent freeing, the method batches lazily several frees in one handler invocation based on the key observation that any frequent freeing in applications is typically of small chunks of memory (e.g., 64-128 B). Consequently, the delayed reclamations due to the batching does not significantly impact memory footprint or performance.

As a result of the above-identified features, SafeBet prevents all variants of Spectre and Meltdown—except the INTEL-specific homonym-based Meltdown attacks—using any current or future side channel. INTEL-specific homonym-based attacks are separately discussed below. Consequently, SafeBet prevents Spectre-v1's proof-of-concept implementation from making even one forbidden access. SafeBet achieves this security via simple table-based access control and replay with virtually no change to the pipeline. Software simulations show that using 18 KB per core for the tables SafeBet performs within 6% on average (and 62% at worst) of the unsafe baseline behind which NDA-restrictive, a previous scheme of comparable (a) security on non-Intel architectures and (b) hardware complexity, lags by 83% on average.

To recap, SafeBet first, instead of unsafely accessing the secret and then preventing its transmission, SafeBet permits speculative accesses and fetches only if in the past the source instruction has non-speculatively accessed or fetched the destination location or instruction. This permission is per source instruction (i.e., permission is not granted if the destination was accessed non-speculatively by some other source). Second, the source-destination pairs are held in the SMACT and SFACT. To keep the hardware simple, potentially unsafe accesses and fetches wait until commit to proceed by leveraging well-known replay for cache misses. Third, optionally, to save space while avoiding aliasing among sources or destinations, SafeBet employs two-level organizations using bit masks to exploit redundancy in the higher order address bits of sources and destinations. Fourth, and also optionally to increase the effective size of tables and decrease false negative rates, SafeBet coarsens the source and destination granularities while enforcing alignment and allocation restrictions in software to prevent unsafe aliasing. Fifth, to revoke the associated permissions when the destination memory is freed, SafeBet employs software invalidation whose overhead is amortized by batching several revocations in software.

As an initial step speculative data accesses are discussed. Speculative data accesses involve (a) access-control check upon speculative access and (b) delayed execution at commit, if deemed potentially unsafe. For the first part, given the source program counter (PC) and the destination address pair (both virtual addresses), the SMACT is looked up in parallel with the TLB and the data cache, as shown in FIG. 1 which is a schematic of an out-of-order issue pipeline with SafeBet tables (SMACT and SFACT). If the SMACT permits the access (the common case), then the source proceeds as usual (our first two contributions). Otherwise, the source returns a replay signal to the pipeline similar to that for a cache miss. The pipeline annuls the source instruction and in-flight later instructions similar to a cache miss, and marks the source (and later instructions) for replay which occurs when the source reaches commit (i.e., the reorder buffer head).

It should be appreciated that instead of waiting until commit, the replay could be triggered sooner when the source becomes non-speculative. However, detecting this condition requires ensuring that all previous speculations in program order have been resolved, which requires complex hardware. Irrespective of the source waiting until commit or becoming non-speculative, the source and its dependent instructions cannot issue until replay. This constraint decreases the overlap between the miss followed by its dependent instructions, and other independent instructions, degrading instruction and memory-level parallelism. Fortunately, SafeBet incurs this overhead only infrequently (i.e., upon SMACT misses). Consequently, SafeBet can afford the simpler option of the source waiting until commit.

Unlike loads, stores are performed in the cache only upon reaching commit. Therefore, stores can bypass the SMACT even though stores may speculatively prefetch the cache block (including coherence permissions). In fact, even disallowed loads can issue a cache/TLB miss prefetch, and update the cache/TLB replacement metadata. Such a prefetch uses the potential secret's address which is regardless known to the attacker and is not a secret; only a secret's value is a secret. Further, the secret may already be present in memory or even the cache. However, the prefetch places any secret value only in the cache but not the pipeline. The prefetch overlaps the miss, but not the miss-dependent instructions, with the delay until replay. For the above reasons, any software or hardware prefetch can bypass the SMACT. However, unlike prefetches, store-value bypass for matching loads via the load-store queue (LSQ) brings the load value into the pipeline. Therefore, a disallowed load cannot return a bypassed store value and must wait for replay.

For the second part of delayed execution at commit, there are two possibilities: (1) the access was permitted during execution, (2) the access was disallowed and marked for replay. In the former case, there is no further action required. In the latter case, the SMACT is updated with the source-destination pair to create the permission, possibly replacing an existing entry. The source is then replayed similar to a miss and completes. A disallowed source may be squashed due to mis-speculation and may never reach commit in which case the source vanishes from the pipeline without any replay. Further, in uncommon cases a source may already be non-speculative at the time of the access. However, SafeBet performs the SMACT lookup as if the instruction were speculative to avoid the difficult determination of the instruction already being non-speculative, especially to capture this uncommon case.

To decrease the false-negative rate—speculative accesses that are actually safe but deemed unsafe due to misses in the table—the SMACT can be made larger or more associative as long as the SMACT latency fits within that of the D-cache and does not introduce delays in the access path. While one may expect to look up the SMACT using the source PC, revoking permissions upon memory free of a destination requires look up using the destination address because only the destination address is available during free unlike speculative accesses where both the source PC and destination addresses are available. Consequently, the SMACT uses an inverted organization of looking up source-destination pairs by accessing using the destination to retrieve the source PC.

Figure 2:
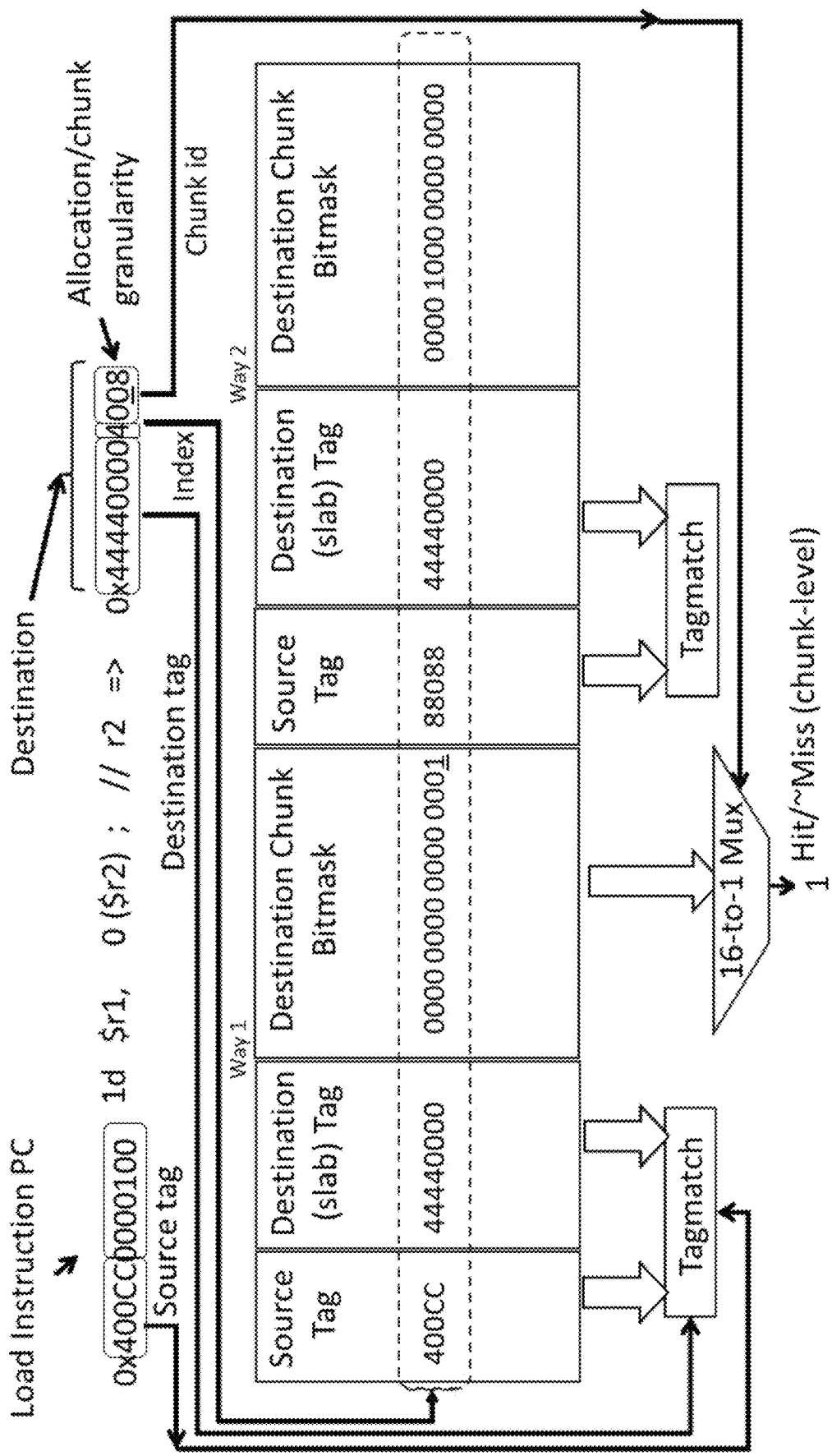
FIG. 2 is a schematic of the SMACT with destination bit mask, the destination matches two entries within the accessed set in the 2-way set associative SMACT but the source matches only one entry.

A key difference between the SMACT and a normal cache is that a given address may match in the cache to at most only one frame whereas a given destination may match in the SMACT to one or more entries within the set to which the destination maps. A speculative access may proceed if any of the matching SMACT entries permit the access; the source is disallowed only if none of the matching entries allow the access or if no entry matches. In FIG. 2, which provides a schematic of the SMACT with destination bit mask, the destination matches two entries within the accessed set in the 2-way set associative SMACT but the source matches only one entry. Such replication both reduces the effective capacity of the SMACT and splinters locality in that each source needs to obtain speculative access permissions individually for the same destination and would incur separate misses in the SMACT. Both these issues can be addressed by safely coarsening the source, as discussed further below.

In order to shrink the SMACT, an observation is made that due to locality many upper-order bits of the source or destination across multiple entries would be the same. To exploit this observation, the source or destination fields are split into two levels using bit masks. In the two-level organization, the table entries, which are logically the first level, correspond to coarse-grained slabs (e.g., 256 B). Each first-level entry employs a bit mask at the second level for finer-grained chunks within the slab (e.g., for destination, 16-byte chunks within a 256-B slab result in 16 bits, as shown in FIG. 2). The $i^{th}$ bit in the bit mask being a 1 or 0 signifies the $i^{th}$ chunk within the slab to be permitted or not for speculative access, respectively.

Although space-efficient, the two-level organization still adds bits whereas coarsening, described next, entirely eliminates bits. The source lends itself to heavy coarsening, whereas only limited coarsening is possible for the destination due to safety concerns. As such, the heavily-coarsened source uses flat, one level organization whereas the lightly-coarsened destination uses bit masks, as described below.

To increase the effective size and decrease false-negative rates, the source and destination granularities are coarsened. However, naive coarsening induces potentially unsafe aliases where the speculative access permissions of a source-destination pair would be inherited by the other aliases. As such, the source can be coarsened to a region granularity (e.g., 256 MB as in FIG. 2) if the code and static data from different trust domains within a process are placed at different regions at region-aligned boundaries (e.g., user code, libraries either together or in subsets, browser, and kernel). Any secret non-speculatively accessible by any part of a trust domain's code is accessible non-speculatively by all of the domain's code (i.e., speculative access permission for one source can be inherited by other sources within one trust domain) and needs protection only from other domains' code. Thus, our placement requirement ensures safety for source coarsening. Such coarsening drastically reduces locality splintering and improves effective SMACT capacity by combining multiple sources into one SMACT entry.

Coarsening the destination, however, needs to consider dynamic memory allocation which can arbitrarily interleave allocations for different intra-process trust-domains in a fine-grained manner. Hence, the destination cannot be coarsened to the same extent as the source. As such, we coarsen the destination to the granularity of the minimum dynamic memory allocation size and its alignment (e.g., 16 B as in FIG. 2). Increasing this minimum size for more coarsening, and hence smaller SMACT, may lead to internal fragmentation of memory and poorer cache hierarchy performance due to degraded spatial locality. We increase the 32-B minimum used in some malloc( ) versions to 64 B. We account for the accompanying performance loss due to our malloc-64( ) (around 1% on average).

In our inverted SMACT organization, the heavily-coarsened source uses a flat, one-level representation. For example, for a 48-bit virtual address with source coarsened to 256 MB regions, the first level holds the upper-order 20 bits (see FIG. 2) The lightly-coarsened destination uses a two-level representation based on bit masks for the entries and pointers for the tag. Also, the slabs can be larger (e.g., 4 KB slab for 64 B chunks) without the bit masks becoming unwieldy.

It should be noted that to prevent gadgets from exploiting already validated victim code via control-flow speculation, we extend our tracking to include control-flow source-destination pairs in the Speculative instruction Fetch Access Control Table (SFACT) (see FIG. 1). The SFACT holds control-flow targets, including those for branches, direct and indirect jumps and calls. While the traditional BTB holds only the branch taken target, SafeBet's safety constraint applies to both taken and fall-through paths of a branch. Consequently, the SFACT holds the fall-through target as well. The pipeline's predict stage produces a predicted next fetch address (destination) given the current fetch address (source). In parallel with the Icache access, the source-destination pair is used to look up the SFACT, as shown in FIG. 1. Like data accesses, disallowed instruction fetches can issue instruction cache/TLB misses and prefetches; and software and hardware prefetches are exempt from SFACT checking. However, a disallowed fetch needs to wait until reaching commit which is a full pipeline drain leading to a completely empty pipeline (i.e., full ILP loss). In comparison, a branch misprediction, detected as soon a branch is resolved which is often well before reaching commit, leads only to a partially empty pipeline vacated by the squashed instructions (i.e., partial ILP loss). Fortunately, SafeBet incurs this loss only infrequently (i.e., upon SFACT misses). Like the SMACT, the SFACT is updated when the source reaches commit.

While the return address stack (RAS) matches calls and returns to achieve accurate prediction, the RAS entry is popped upon return so that any information tracked would be lost. Consequently, we use the SFACT to track additionally source-destination pairs for non-speculative returns. The purpose here is to track the address (or addresses) to which a return jumped non-speculatively in the past, and not to match calls and returns. Consequently, the source-destination pairs are placed in the SFACT—a table and not a stack. Because a given function may be called from different call sites, each instance of the function's return jumps to a different return address. Consequently, the SFACT may track multiple return addresses per return. However, each return jumps only to a few different return addresses (e.g., 2-3) in a small window of execution time, even if a return jumps to more return addresses in the entire execution. Consequently, tracking a few return addresses per return suffices for good performance (e.g., 4).

To save area, the BTB often uses partial tags and partial payload (target). Only a few tag bits are enough to achieve highly accurate PC-to-BTB-entry match for prediction. Similarly, the payload contains only enough target bits to index into the I-cache (and the I-TLB) and accurately retrieve the target instruction. For prediction verification, the predicted PC can be constructed using the I-cache's tag bits. However, speculative access control does not permit such arbitrary coarsening of the source-destination pairs. Fortunately, like in the SMACT, the source can be coarsened to a region under the previous constraint that different software components are aligned at the region boundaries. However, the destination remains fine-grained because it is hard to guarantee the absence of gadgets within coarser-grained regions of code.

Like the SMACT, the SFACT also employs an inverted organization which looks up using the destination address. The heavily-coarsened SFACT source uses a flat, one-level representation. The SFACT destination uses a bit mask-based two-level representation with a few differences from that of the SMACT. (1) While data locations are contiguous and dense, control-flow taken and fall-through targets are sparse (e.g., one per basic block). While this sparsity would suggest a second-level chunk granularity of 4-5 instructions, the target occurrence is irregular in that some basic blocks are short while others are longer. Any sparse representation would have to accommodate such irregularity. Further, to avoid gadgets the representation would have to track the destination address at the byte level (x86 has byte-size instructions). To avoid these issues, we use simple byte-granularity second level chunks (i.e., each bit in the bit mask corresponds to a byte). (2) Because the chunk granularity is just a byte and because spatial locality extends to function bodies which tend to be small, we employ smaller slabs for SFACT than those for SMACT (e.g., 128 B).

To handle simultaneous multithreading (SMT), the SMACT and SFACT entries may include process identifiers (PIDs) or be privatized for each SMT context to ensure isolation. To handle context switches, the SMACT and SFACT entries may include PIDs or the entire tables may be flushed at context switches. Similar to NDA, we treat special register accesses (e.g., x86's RDMSR) as memory accesses to special destinations. While floating-point registers can also be treated similarly to prevent the Lazy-FP attack, these registers are not virtualized. Hence, PIDs are insufficient for their entries which must be flushed at context switches.

The permissions for a source-destination pair must be revoked when the destination memory is freed to prevent stale permissions from incorrectly allowing speculative accesses. To avoid cache coherence-like complexity, we advocate using software to invalidate the tables (similar to TLB shootdowns by the OS). However, such software-based revocations incur overhead mainly (1) to invoke a handler and (2) to trigger inter-processor interrupts to invoke the handler on all the cores of multicore. Such inter-processor interrupts disrupt execution on all the cores, hurting overall throughput. The actual invalidation of a table entry occur at L1 cache hit speeds (SMACT and SFACT accesses) and does not impose much overhead over the usual work in free( ). Consequently, we propose to amortize the handler invocation cost by batching lazily several memory frees.

Unlike batching TLB shootdowns which raises TLB coherence, TLB consistency, and OS semantics issues (e.g., batching violates POSIX semantics), our batching simply delays freeing of memory without any correctness issues. A performance issue, however, is that delaying the frees increases the memory footprint and decreases locality by forcing distant reuse of the freed memory. Less batching decreases these batching overheads but increases the above handler invocation overhead. Fortunately, frequent freeing in applications, requiring more batching, is typically of small chunks of memory (e.g., 64-128 B). We balance the two overheads via two thresholds based on empirically-observed rate and memory size of frees. Assuming 10 K cycles per handler instance on each core of a 32-core multicore, we empirically find that an instruction throughput overhead of under 1% for our benchmarks (i.e., one invocation per 10 K*32*100=32 M cycles) requires batching up to 25 K frees or 2 MB of to-be-freed memory (the two thresholds). While 2 MB adds negligible memory footprint, we evaluate the batching overhead as provided below.

We modify free( ) to check whether either threshold is exceeded (see Algorithm 2, below). If not, free( ) simply adds the to-be-freed memory to a pending set. If so, free( ) invokes the handler, passing the set, to revoke the permissions. Then free( ) reclaims the corresponding memory to be re-allocated in the future. The handler invalidates each relevant table entry one by one. Another option is to invalidate the entire table. A corner case that may come to mind is that after a permission is revoked, a core may re-acquire the permission by accessing the freed memory. However, the permission is granted only if the access reaches commit, a non-speculative use-after-free bug which is beyond the scope of SafeBet. In JavaScript, for example, a dynamic down-sizing of an array would not lead to such a bug because the bounds checking would disallow access to the freed memory beyond the new array boundary. Any such access due to mis-speculation of the bounds check would not reach commit to re-acquire the permission.

---
ALGORITHM 2 Lazy-Free
---

```
1:  function LAZYFREE(ptr)
2:      freedSize ← freedSize + findAllocSize(ptr)
3:      count ← count + 1              ▷ Track free count
4:      pendingFree[count] ← ptr       ▷ Append to list
5:      if (count >25,000) OR (freedSize >2M) then
6:          handler(pendingFree, count)    ▷ Invoke handler
7:      end if
8:  end function
```

Analogous to freeing of data memory, the code memory can be modified or freed (e.g., dynamic linking or just-in-time (JIT) compiling). Code memory changes affect both the source and destination of the permissions (the source in the SMACT, and the source and destination in the SFACT). Considering the SMACT and SFACT sources, we observe that code modifications usually do not require the existing permissions to change because the rest of the code in the region and its permissions do not change, so it is not meaningful to change the permissions only for the new code within the same region (e.g., reJITing a function). Any new code installed in a new region freshly acquires permissions upon commit, as usual (e.g., a new browser tab). The cases where the new code reuses an existing region (e.g., a new browser tab replacing an old tab) require the existing permissions to be revoked, which involves source-based invalidations whereas all the previously-discussed invalidations have been destination-based. There are two options for source-based invalidations: The handler invalidates either (1) each table entry that matches on the source, or (2) the entire table.

INTEL-SPECIFIC HOMONYM-BASED ATTACKS: Recall that the INTEL-specific homonym-based attacks exploit lazy TLB checking or speculating past TLB misses. The unsafe transient accesses can be prevented if the SMACT uses physical addresses instead of virtual addresses for the destination. The SMACT would be virtually-indexed and physically-tagged using the destination address, and accessed in parallel to the TLB and cache (i.e., the SMACT lookup critical path remains unchanged). The destination physical tag from the SMACT is checked eagerly against the D-TLB output or its prediction. While D-TLB hits and predictions that are full addresses are straightforward, partial-address predictions choose the best-matching SMACT tag within the accessed SMACT set, effectively providing the predicted full address for the access. If the partial address yields a correct prediction in the original scheme, then the matching tag is also likely to do so. Any incorrect choice still results in an SMACT-permitted access and not a disallowed access, though the predicted address may be incorrect. The source remains virtual to allow coarsening beyond page sizes. Further, the destination tag must include the full physical page number which, fortunately, is not a problem because page-sized destination slabs perform well. Because the destination is not coarsened beyond the page granularity (i.e., the chunks are smaller than a page), there are no challenges with destination coarsening. Physically-tagged structures need not be flushed upon context switches, though TLB shootdowns have to be applied to the physically-tagged SMACT as well. However, malicious virtual machines can update 'not present' guest page table entries with forbidden physical addresses to which Intel hardware allows speculative accesses. In this case, the unflushed SMACT would allow a malicious virtual machine to use a victim virtual machine's physically-tagged permissions. This problem can be prevented by flushing the SMACT table upon context switches, disallowing speculation on 'not present' page table entries (while allowing other predictions), or adding PIDs to the source address (to prevent the reuse of permissions across virtual machines).

Unlike virtually-indexed caches, there are no synonym issues because synonyms can look up different entries in the tables similar to the TLB.

Considering the SFACT destinations, the new code will likely have different control-flow targets than the previous code. Therefore, the existing permissions with the previous destinations are susceptible to potential gadgets in the new code. We eliminate this problem by invalidating the relevant permissions via the revocation handler. Because code modifications are infrequent by design for performance reasons, our handler overheads are expected to be low.

Figure 3:
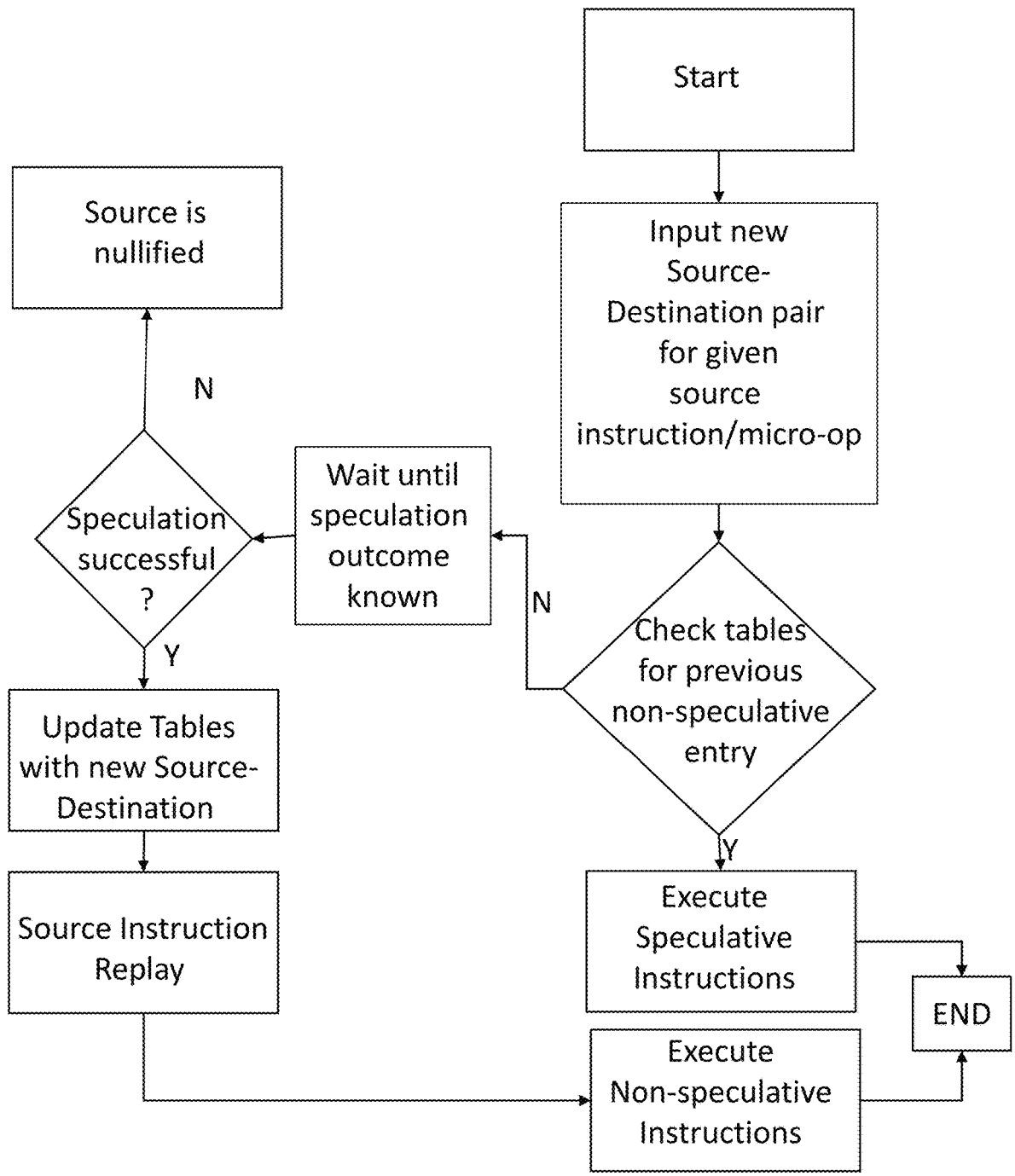
FIG. 3 is a flowchart that is based on the method of the present disclosure, wherein the flowchart begins by inputting a given source instruction's source-destination pair for examination and details steps in execution of speculative instructions.

Referring to FIG. 3, a flowchart is presented based on the method of the present disclosure. The flowchart begins by inputting a given source instruction's source-destination pair for examination. These pairs exist in the processor pipeline. The processing of each pair coming from the pipeline is shown in FIG. 3. The examination includes checking tables (SMACT and/or SFACT) to determine if the source-destination pair has been successfully executed previously which then causes execution for the given source instruction to proceed. If, however, the tables do not determine that the source-destination pair has been successfully executed previously then the source instruction waits for its speculation outcome to be known. If the outcome is success, then the source instruction updates the tables with the source-destination pair and the proceeds to execute. Mechanisms for executing instructions after some waiting include replay. If the outcome is failure, then the source instruction, and potentially other instructions, are nullified.

Figure 4:
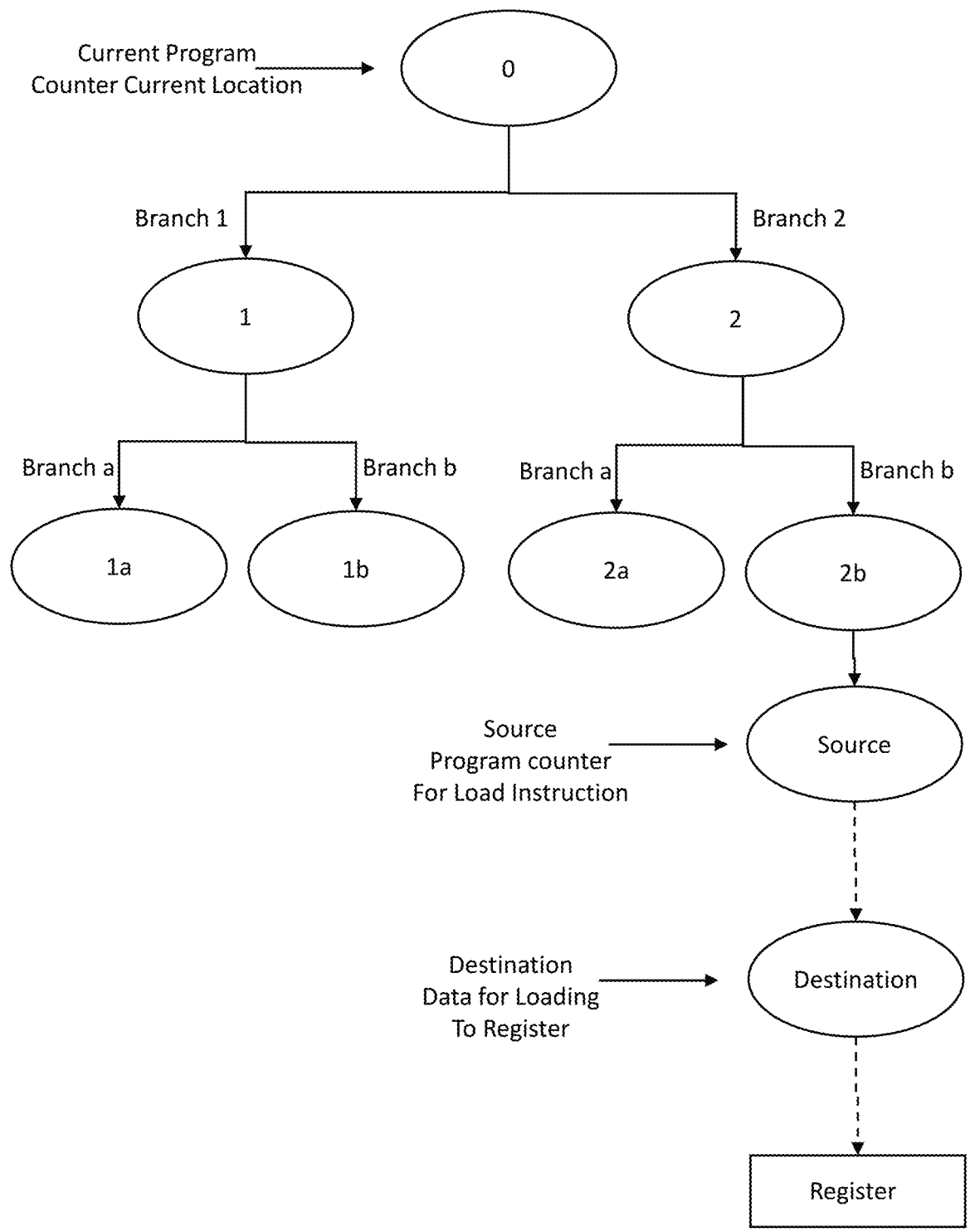
FIG. 4 is a flowchart which provides one example of how the speculative execution works according to the present disclosure.

In order to better describe the process of determining if the speculation is successful, e.g., as provided in FIG. 3, the following example is provided with reference to FIG. 4. It should be noted that speculation may be based on a variety of different schemes. For example, speculative execution may be based on branch-speculation (i.e., which branch leads to the instruction for speculative execution is in question). Other examples may include speculation based on output of one instruction feeding another instruction. The present disclosure is agnostic as to the scheme on the basis of which speculation is developed.

With reference to FIG. 4 a flowchart is provided which provides one example of how the speculative execution works according to the present disclosure. The example provided in FIG. 4 is based on branch speculation. Suppose the program counter is currently at location 0. Due to various memory latencies, a scheme for speculative execution speculates that the source-destination pair following path 0→2→2b is to be speculatively executed. Further, suppose the source represents a load instruction (i.e., obtaining a value held at the destination and loading that value onto a register). If the source-destination pair already exists in the SMACT indicating a secure speculative execution, then the processor proceeds with executing the load instruction, speculatively. However, if the source-destination pair is not in the SMACT, then the speculative execution is halted. Instead the instruction pipeline determines if the program execution progresses from 0→2→2b. If not, the pipeline nullifies the load instruction associated with the source-destination pair. If however, the program execution progresses from 0→2→2b and the load instruction in source reaches commit, then the load instruction associated with source-destination pair is actually executed through a replay.

The example shown in FIG. 4 is a mis-speculation based on a branch misprediction. The pipeline determines the branch outcome and flags a mis-speculation if the outcome is not the same as the branch prediction. If a mis-prediction is identified, the pipeline squashes the instructions after the mis-predicted branch is identified; then there are three possibilities for the load: (1) If the load is simply waiting in the pipeline to execute because its operands are not ready, then the pipeline annuls the load instruction and other such instructions. (2) If the load attempted to execute in the past when its operands were ready but was disallowed by the SMACT because the source-destination pair was absent in the SMACT and is now waiting to reach commit, then the pipeline annuls the load instruction and other such instructions. (3) If the load was allowed by the SMACT because the source-destination pair was present and has already executed, then the pipeline rolls back the effects of load and other such instructions. In all these cases, the pipeline resets the reorder buffer (ROB) tail pointer to the mis-predicted branch which is currently the last correct instruction (a mis-predicted branch itself may be correct though the following instructions are incorrect due to the misprediction). Instruction fetch resumes from the correct target.

A cache miss replay occurs when a load or store instruction incurs a miss upon accessing the cache. In the baseline speculative execution (i.e., without SafeBet), the instruction does not exit the pipeline as usual and instead stays in the pipeline until the cache miss returns from the memory hierarchy with the missing cache block which is placed in the cache. At that point, the instruction is replayed—i.e., re-executed—to access the cache again which results in a cache hit. The instruction completes and exits the pipeline (but waits in the ROB until commit or a later squash). SafeBet exploits the replay mechanism for the load instructions whose source-destination pairs are absent in the SMACT. Such load instructions wait until reaching commit. If speculation of all the instructions before a waiting load instruction was correct then the load instruction actually reaches commit (i.e., the head of the ROB), at which point the load instruction updates the SMACT with its source-destination pair and is replayed; otherwise, a mis-speculation has occurred which results in the later instructions including the load instruction being squashed.

Those having ordinary skill in the art will recognize that numerous modifications can be made to the specific implementations described above. The implementations should not be limited to the particular limitations described. Other implementations may be possible.

The invention claimed is:

1. A method of verifying authenticity of a speculative load instruction, comprising:
   receiving a new speculative source-destination pair (new speculative PAIR), wherein the source represents the speculative load instruction identified by an associated source virtual memory location where the speculative load instruction is located and the destination represents an associated destination virtual memory location holding data to be loaded onto a register with execution of the source;
   checking the new speculative PAIR against one or more memory tables each having memory source-destination pairs associated with previous combinations of source-destination pairs that have successfully cleared as non-speculative source-destination pairs, wherein the memory source-destination pairs represent one or more virtual memory locations associated with the source and the destination;

if the new speculative PAIR exists in the one or more memory tables, executing the source of the new speculative PAIR;

if the new speculative PAIR does not exist in the one or more memory tables, i) waiting until speculation of the source of the new speculative PAIR has cleared as being non-speculative or one or more clock cycles later, ii) updating the one or more memory tables, wherein the updating is associated with inclusion of the new speculative PAIR as a new authentic pair, and iii) executing the source of the new speculative PAIR; and if the speculation of the source of the new speculative PAIR does not clear as non-speculative, then the source of the new speculative PAIR is nullified.

2. The method of claim 1, wherein the one or more memory tables includes a Speculative Memory Access Control Table (SMACT) housing authentic source-destination pairs.

3. The method of claim 1, wherein the speculation of the source of the new speculative PAIR is cleared as non-speculative when the source of the new speculative PAIR reaches a head of a Reorder Buffer.

4. The method of claim 1, wherein if the new speculative PAIR does not exist in the one or more memory tables, the step of executing the source of the new speculative PAIR is accomplished by using a replay.

5. The method of claim 1, wherein the step of checking the new speculative PAIR against one or more memory tables consists of using the source of the new speculative PAIR to look up previous combinations of source-destination pairs that have successfully cleared as non-speculative source-destination pairs.

6. The method of claim 1, wherein the step of checking the new speculative PAIR against one or more memory tables consists of using the destination of the new speculative PAIR to look up previous combinations of source-destination pairs that have successfully cleared as non-speculative source-destination pairs.

7. The method of claim 1, wherein the memory source-destination pairs are represented as a coarse-grained set of locations augmented with a bit mask to identify one or more of finer-grain locations contained within the coarse-grained set.

8. The method of claim 1, wherein each of the one or more memory table entries associated with the previous combinations of source-destination pairs that have successfully cleared as non-speculative source-destination pairs are amended via hardware or software control.

9. The method of claim 1, wherein the source is i) a complete instruction or ii) a micro-operation included in a complex instruction comprising a plurality of micro-operations.

10. A method of verifying authenticity of a speculative load instruction, comprising:

receiving a new speculative source-destination pair (new speculative PAIR), wherein the source represents the speculative load instruction identified by an associated source physical memory location where the speculative load instruction is located and the destination represents an associated destination physical memory location holding data to be loaded onto a register with execution of the source;

checking the new speculative PAIR against one or more memory tables each having memory source-destination pairs associated with previous combinations of source-destination pairs that have successfully cleared as non-speculative source-destination pairs, wherein the memory source-destination pairs represent one or more virtual memory locations associated with the source and the destination;

if the new speculative PAIR exists in the one or more memory tables, executing the source of the new speculative PAIR;

if the new speculative PAIR does not exist in the one or more memory tables, i) waiting until speculation of the source of the new speculative PAIR has cleared as being non-speculative or one or more program counter clock cycles later, ii) updating the one or more memory tables, wherein the updating is associated with inclusion of the new speculative PAIR as a new authentic pair, and iii) executing the source of the new speculative PAIR; and if the speculation of the source of the new speculative PAIR does not clear as non-speculative, then the source of the new speculative PAIR is nullified.

11. The method of claim 10, wherein the one or more memory tables includes a Speculative Memory Access Control Table (SMACT) housing authentic source-destination pairs.

12. The method of claim 10, wherein the speculation of the source of the new speculative PAIR is cleared as non-speculative when the source of the new speculative PAIR reaches a head of a Reorder Buffer.

13. The method of claim 10, wherein if the new speculative PAIR does not exist in the one or more memory tables, the step of executing the source of the new speculative PAIR is accomplished by using a replay.

14. The method of claim 10, wherein the step of checking the new speculative PAIR against one or more memory tables consists of using the source of the new speculative PAIR to look up previous combinations of source-destination pairs that have successfully cleared as non-speculative source-destination pairs.

15. The method of claim 10, wherein the step of checking the new speculative PAIR against one or more memory tables consists of using the destination of the new speculative PAIR to look up previous combinations of source-destination pairs that have successfully cleared as non-speculative source-destination pairs.

16. The method of claim 10, wherein each of the memory source-destination pairs is represented as a coarse-grained set of locations augmented with a bit mask to identify one or more finer-grain locations contained within the coarse-grained set.

17. The method of claim 10, wherein each of the one or more memory table entries associated with the previous combinations of source-destination pairs that have successfully cleared as non-speculative source-destination pairs are amended via hardware or software control.

18. The method of claim 10, wherein the source is i) a complete instruction or ii) a micro-operation included in a complex instruction comprising a plurality of micro-operations.

19. The method of claim 10, wherein the associated source physical memory location and the associated destination physical memory location are presented as partial addresses and the step of checking the new speculative PAIR against one or more memory tables consists of finding a best match.

* * * * *